US009875545B2

(12) United States Patent
Rhee et al.

(10) Patent No.: US 9,875,545 B2
(45) Date of Patent: Jan. 23, 2018

(54) CAMERA POSE ESTIMATION APPARATUS AND METHOD

(71) Applicant: SAMSUNG ELECTRONICS CO., LTD., Suwon-si (KR)

(72) Inventors: Seon Min Rhee, Suwon-si (KR); Hyong Euk Lee, Suwon-si (KR); Yong Beom Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/903,982

(22) PCT Filed: May 15, 2014

(86) PCT No.: PCT/KR2014/004355
§ 371 (c)(1),
(2) Date: Jan. 8, 2016

(87) PCT Pub. No.: WO2015/005577
PCT Pub. Date: Jan. 15, 2015

(65) Prior Publication Data
US 2016/0171703 A1    Jun. 16, 2016

(30) Foreign Application Priority Data

Jul. 9, 2013 (KR) .......................... 10-2013-0080598

(51) Int. Cl.
*G06K 9/00* (2006.01)
*G06T 7/00* (2017.01)
(Continued)

(52) U.S. Cl.
CPC .............. *G06T 7/0044* (2013.01); *G06T 7/33* (2017.01); *G06T 7/38* (2017.01); *G06T 7/80* (2017.01);
(Continued)

(58) Field of Classification Search
CPC . G06T 2207/10028; G06T 2207/30244; G06T 2207/10016; G06T 2207/10024;
(Continued)

(56) References Cited

U.S. PATENT DOCUMENTS 7,187,809 B2 * 3/2007 Zhao .................. G06K 9/00214
382/285
8,031,906 B2   10/2011 Fujimura et al.
(Continued)

FOREIGN PATENT DOCUMENTS

KR       10-1054736 B1     8/2011
WO       WO 2013/029675 A1  3/2013

OTHER PUBLICATIONS

Ivan et al ("Real-Time Pose estimation with RGB-D camera", 2012 IEEE international conference on Multisensor Fusion and integration for Intelligent systems (MFI), Sep. 13-15, 2012, Hamburg, Germany).*
(Continued)

*Primary Examiner* — Amara Abdi
(74) *Attorney, Agent, or Firm* — NSIP Law (57) ABSTRACT

Provided is a camera pose estimation apparatus that estimates an initial camera pose using one of an input depth image and an input color image, and refines the initial camera pose using the other image. When the initial camera pose is estimated using the input depth image, the radius of a first area, in which color information is matched for refinement, can be adaptively set according to the distribution of the depth value of at least one first point that is subject to matching.

16 Claims, 8 Drawing Sheets i<sup>TH</sup> FRAME 311    312

(i+1)<sup>TH</sup> FRAME 321    322

(51) Int. Cl.
    H04N 5/232      (2006.01)
    G06T 7/80       (2017.01)
    G06T 7/33       (2017.01)
    G06T 7/38       (2017.01)

(52) U.S. Cl.
    CPC ............... *G06T 7/85* (2017.01); *H04N 5/232* (2013.01); *G06T 2207/10016* (2013.01); *G06T 2207/10024* (2013.01); *G06T 2207/10028* (2013.01); *G06T 2207/30244* (2013.01)

(58) Field of Classification Search
    CPC ... G06T 7/0028; G06T 7/0018; G06T 7/0044; G06T 7/002; G06T 7/0038; H04N 5/332; G06K 9/46; G06K 9/00536; G06K 9/6211
    See application file for complete search history.

(56) References Cited

U.S. PATENT DOCUMENTS

| | | | | |
|---|---|---|---|---|
| 2008/0152191 | A1* | 6/2008 | Fujimura | ........... G06K 9/00214 382/103 |
| 2009/0180668 | A1* | 7/2009 | Jones | .................. G06F 3/017 382/103 |
| 2011/0286661 | A1* | 11/2011 | Lee | .................. H04N 13/0022 382/154 |
| 2012/0194644 | A1* | 8/2012 | Newcombe | ............... G06T 7/20 348/46 |
| 2012/0195471 | A1* | 8/2012 | Newcombe | ............. G06T 7/215 382/106 |
| 2014/0139639 | A1* | 5/2014 | Wagner | .............. H04N 13/0253 348/46 |
| 2014/0341421 | A1* | 11/2014 | Porikli | ............... G06K 9/00369 382/103 |

OTHER PUBLICATIONS

Klein, Georg, et al. "Parallel Tracking and Mapping for Small AR Workspaces." Active Vision Laboratory, Department of Engineering Science, University of Oxford, ISMAR '07 Proceedings of the 2007 $6^{th}$ IEEE and ACM International Symposium on Mixed and Augmented Reality (10 pages in English).

Dryanovski, Ivan, et al. "Real-Time Pose Estimation with RGB-D Camera." Multisensor Fusion and Integration for Intelligent Systems (MFI), 2012 IEEE International Conference on. IEEE, Sep. 13-15, 2012, Hamburg, Germany. (7 pages in English).

International Search Report and Written Opinion dated Aug. 22, 2014 in counterpart International Application No. PCT/KR2014/004355 (5 pages with English translation).

* cited by examiner

CAMERA POSE ESTIMATION APPARATUS AND METHOD

CROSS REFERENCE TO RELATED APPLICATION(S)

This application is a National Phase entry of PCT Application No. PCT/KR2014/004355, filed on May 15, 2014, which claims priority under 35 U.S.C. § 119(e), 120 and 365(c) to Korean Patent Application No. 10-2013-0080598, filed on Jul. 9, 2013 in the Korean Intellectual Property Office, the entire disclosures of each of which are incorporated herein by reference for all purposes.

BACKGROUND

1. Field

The following description relates to camera pose estimation, and more particularly, to an apparatus and method for camera pose estimation using an input depth image and/or an input color image.

2. Description of Related Art

Camera pose estimation refers to determining translation information and rotation information of a dynamically varying camera viewpoint that is used as a reference. The use field of such camera pose estimation is being expanded to other fields, such as, mixed reality, augmented reality, robot navigation, and three-dimensional (3D) reconstruction, for example.

In the related art, in general, a camera pose may be estimated using matching of color images. However, when texture information within a color image is insufficient, it is difficult to extract a feature. In addition, an error may occur in a scene in which a similar pattern is repeated.

Even though research on camera pose estimation using a depth image acquired by a currently widely used depth camera is being conducted, an error may occur due to noise occurring during a depth sensing process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for camera pose estimation, the apparatus including an estimator configured to estimate an initial camera pose associated with a first image by matching at least one first point included in a first frame and at least one second point included in a second frame with respect to the first image that is one of an input depth image and an input color image, and a refiner configured to provide a refined camera pose by refining the initial camera pose using a second image between the input depth image and the input color image.

The estimator may be further configured to match the at least one first point and the at least one second point using an iterative closest point (ICP) algorithm.

The first image may correspond to the input depth image and the second image corresponds to the input color image.

The estimator may be further configured to select the at least one first point included in the first frame and the at least one second point included in the second frame, from among point clouds included in the input depth image.

The estimator may be further configured to select, from the first frame and the second frame, at least one point having a depth variation less than or equal to a threshold variation among the point clouds.

The refiner may be further configured to refine the initial camera pose based on the input color image within a first region included in a first radius around the at least one first point.

The first radius may be set to increase according to an increase in a depth value of the at least one first point.

In another general aspect, there is provided an apparatus for camera pose estimation, the apparatus including a determiner configured to determine a camera pose estimation mode associated with an input depth image and an input color image by analyzing at least one feature of the input depth image and the input color image, an estimator configured to estimate an initial camera pose between a first frame and a second frame by matching at least one first point included in the first frame and at least one second point included in the second frame different from the first frame, with respect to the input depth image when the determined camera pose estimation mode corresponds to a camera pose estimation using all of the input depth image and the input color image, and a refiner configured to provide a refined camera pose by refining the initial camera pose through matching between surrounding color information of the at least one first point and surrounding color information of the at least one second point using the input color image.

The determiner may be further configured to determine that the camera pose estimation mode corresponds to the camera pose estimation using all of the input depth image and the input color image, in response to a depth feature point extracted from a depth value of the input depth image being greater than or equal to a first threshold, and a color feature point extracted from a color value of the input color image being greater than or equal to a second threshold.

The refiner may be further configured to refine the initial camera pose based on the input color image within a first region included in a first radius around the at least one first point.

The first radius may be set to increase according to an increase in a depth value of the at least one first point.

In another general aspect, there is provided a method for camera pose estimation, the method including estimating, by an estimator of a camera pose estimation apparatus, an initial camera pose associated with an input depth image by primarily matching at least one first point included in a first frame and at least one second point included in a second frame, with respect to the input depth image using an ICP algorithm; and establishing, by a refiner of the camera pose estimation apparatus, a first radius of a first region including the at least one first point in order to perform secondary matching using an input color image associated with the input depth image, the secondary matching using a color feature matching within the first region.

The first radius may be set to increase according to an increase in a depth value of the at least one first point.

The camera pose estimation method may further include determining, by a determiner of the camera pose estimation apparatus, a camera mode estimation mode based on depth feature information extracted from the input depth image and color feature information extracted from the input color image.

Each of the at least one first point and the at least one second point may correspond to a point having a reliability greater than or equal to a predetermined threshold based on a depth distribution.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness. However, the present disclosure is not limited or restricted thereby. Here, like reference numerals refer to like elements throughout.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
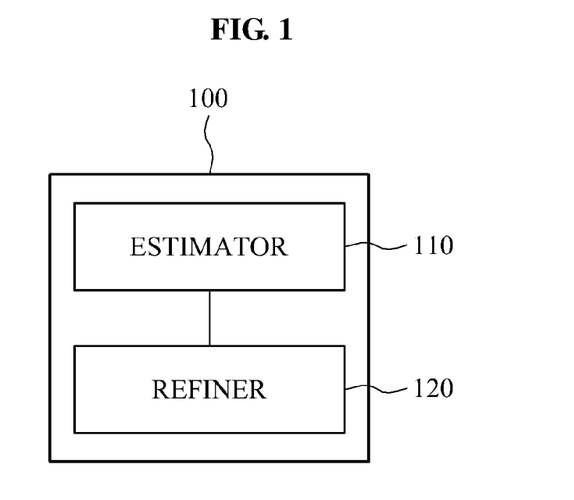
FIG. 1 is a diagram illustrating an example of a camera pose estimation apparatus.

FIG. 1 illustrates an example of a camera pose estimation apparatus 100.

Referring to FIG. 1, the camera pose estimation apparatus 100 includes an estimator 110 and a refiner 120. The estimator 110 estimates an initial camera pose by performing point cloud matching between frames using an input depth image and the refiner 120 refines the initial camera pose using an input color image. The estimator 110 may perform estimation using color information and the refiner 120 may refine initial camera pose information using depth information. Accordingly, even though not particularly described, various example embodiments may be included.

The estimator 110 may perform pose estimation between frames with respect to at least one first point included in the input depth image, using an iterative closest point (ICP) algorithm.

In this example, with respect to a predetermined number of frames that are not estimated, pixels having a variation less than or equal to a predetermined threshold may be sampled based on the mean and variation of the respective pixels in the input depth image. A portion of a three-dimensional (3D) point cloud corresponding to the sampled pixels may be at least one first point used for the camera pose estimation.

By referring to the input color image, accuracy may be enhanced by excluding from a point used for the camera pose estimation, a pixel having a relatively dark color, having a relatively small color intensity, and/or having a relatively small infrared (IR) reception intensity used for determining an input depth image.

The refiner 120 may refine the initial camera pose estimated by the estimator 110.

In this example, noise may be present within geometric information of the input depth image, a first region having a first radius may be set to be around each of the at least one first point used for initial camera pose estimation, and points within the first region may be determined as final points to be used for matching.

The first radius may be adaptively set. For example, the first radius may be set to increase according to an increase in a distance between the first point and a camera viewpoint, for example, an increase in a depth value. The present examples consider that an error may increase when a depth value is great.

The refiner 120 may refine the accuracy of the result of estimating the initial camera pose using the input color image.

An initial camera pose estimation process of the estimator 110 and a pose refining process of the refiner 120 will be further described with reference to FIG. 2 through FIG. 7.

Figure 2:
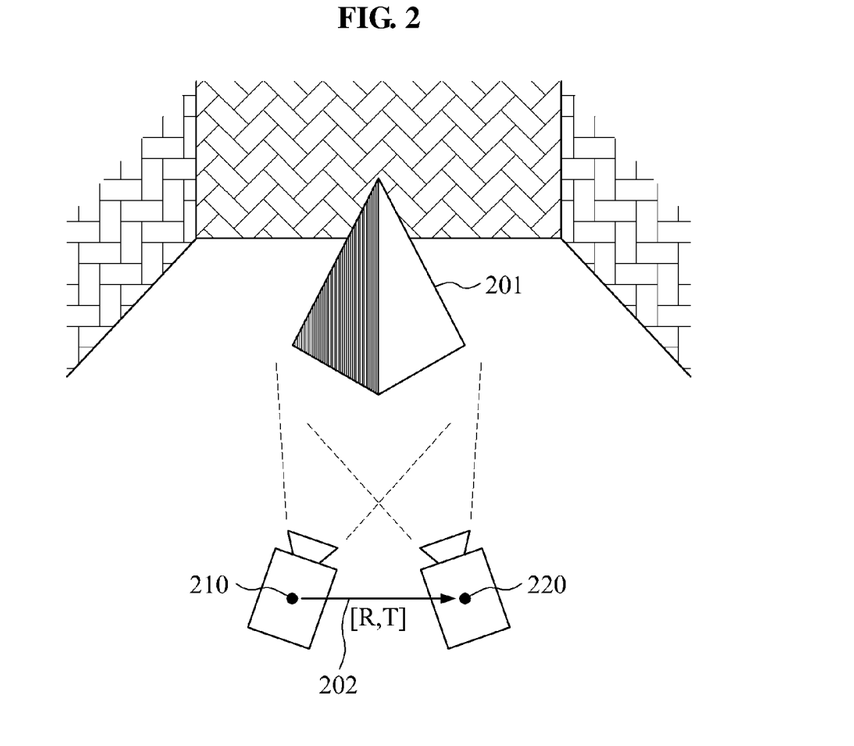
FIG. 2 is a diagram illustrating an example of a virtual scene to describe a camera pose estimation method.

FIG. 2 illustrates an example of a virtual scene to describe a camera pose estimation method.

Referring to FIG. 2, a camera viewpoint 210 may correspond to an $i^{th}$ frame that is a first frame and a camera viewpoint 220 may correspond to an $(i+1)^{th}$ frame that is a second frame different from the first frame.

A transformation 202 between the camera viewpoints 210 and 220 may be expressed as a transformation matrix M=[R|T]. The camera pose estimation may correspond to determining the transformation matrix M.

Based on color texture information and depth feature information included in a scene and an object 201, only an input color image may be used to estimate a camera pose and only an input depth image may be used to estimate the camera pose. In another example, all of the input color input and the input depth image may be used. The above selection will be described with reference to FIG. 8 through FIG. 10. Hereinafter, an example in which all of the input color image and the input depth image are used will be described with reference to FIG. 3 through FIG. 7.

Figure 3:
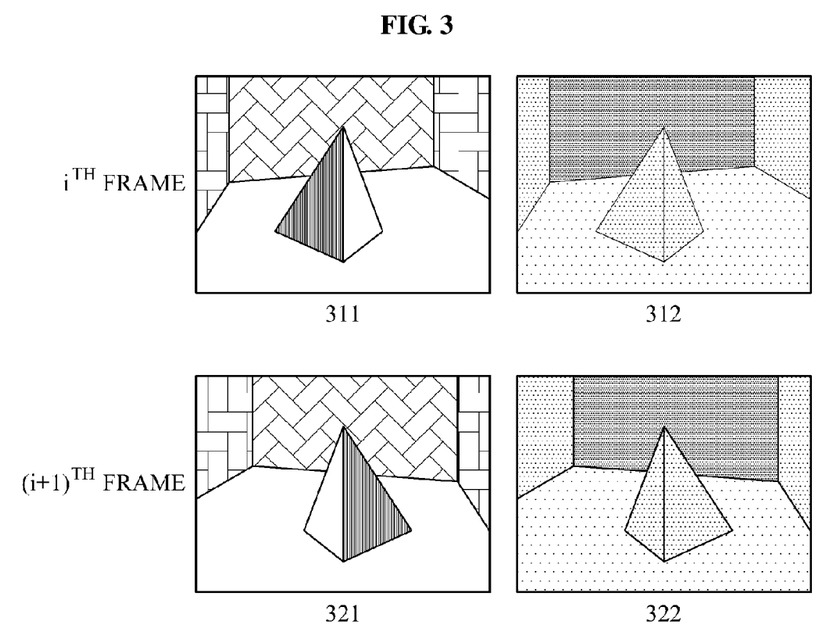
FIG. 3 is a diagram illustrating examples of a color image and a depth image input from a camera and a plurality of frames.

FIG. 3 illustrates examples of a color image and a depth image input from a camera and a plurality of frames.

A color image 311 and a depth image 312 input from an $i^{th}$ frame may be matched to each other. In another example, the color image 311 and the depth image 312 may be acquired through a sensor capable of performing color sensing and depth sensing from a point in time when photographing is performed.

A color image 321 and a depth image 322 input from an $(i+1)^{th}$ frame may be matched to each other.

In the case of using only a color image, camera pose estimation may be performed between the $i^{th}$ frame and the $(i+1)^{th}$ frame by extracting and matching color features of the color images 311 and 321.

In the case of using only a depth image, camera pose estimation may be performed between the $i^{th}$ frame and the $(i+1)^{th}$ frame by extracting and matching geometric features of the depth images 312 and 322.

All of the color images 311 and 321 and the depth images 312 and 322 may be used to estimate the camera pose.

The estimator 110 of FIG. 1 may estimate an initial camera pose by performing an ICP algorithm using the depth images 312 and 322. In this example, due to a noise characteristic of the depth images 312 and 312, a satisfactory level of accuracy of the initial camera pose may not be achieved.

Accordingly, the refiner 120 may refine the initial camera pose using the color images 311 and 321. In one example, a more accurate matching result may be achieved by performing color information matching with respect to a predetermined radius around at least one first point used for the initial camera pose estimation in a 3D point cloud to provide a refined camera pose.

In one example, since advantages of all of an input color image and an input depth image are used, the accuracy of camera pose estimation may be enhanced. Further, flexible processing may be performed by adaptively selecting and using one of the input color image and the input depth image based on a characteristic of a scene or by using all of the input color image and the input depth image.

The camera pose estimation process and the pose refining process will be described with reference to FIG. 4 through FIG. 7.

Figures 4, 5:
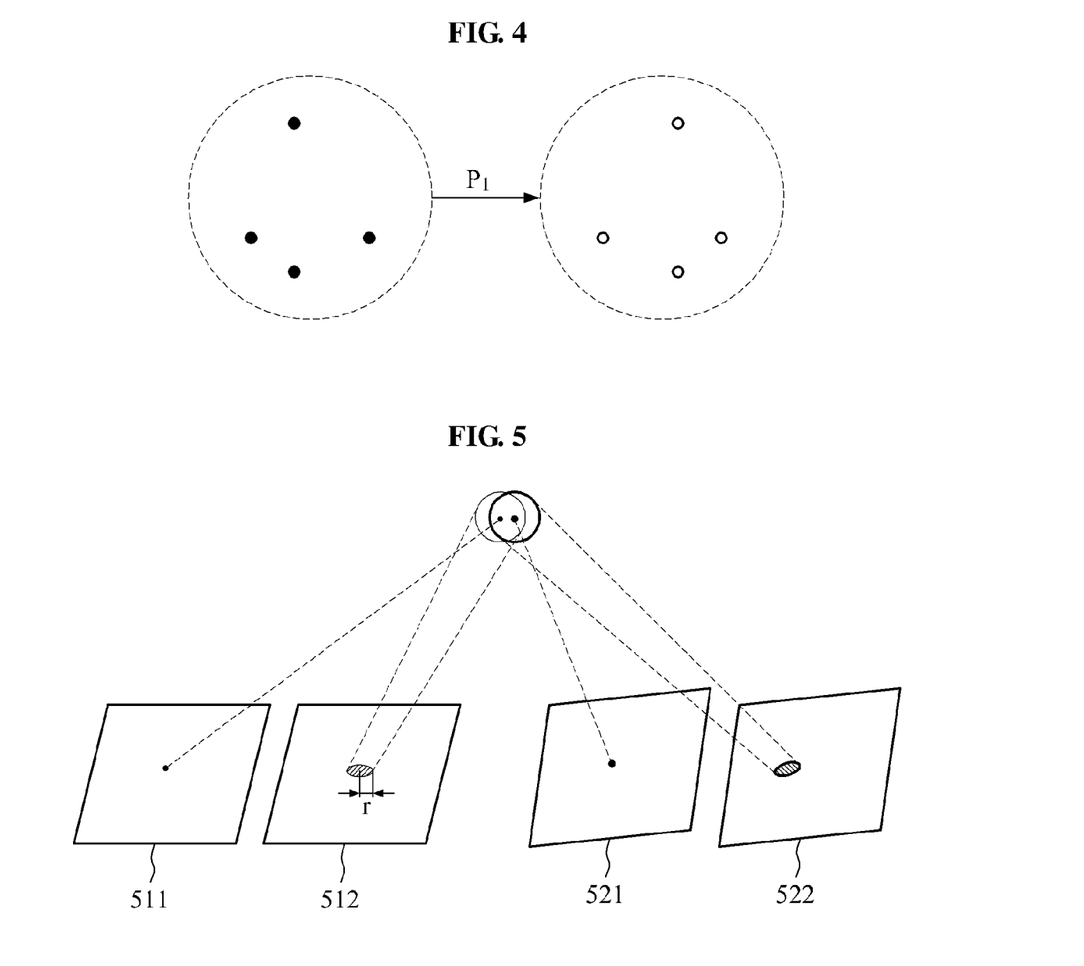
FIG. 4 is a diagram illustrating an example of a process of estimating an initial camera pose.
FIG. 5 is a diagram illustrating an example of a pose refining process.

FIG. 4 illustrates an example of a process of estimating an initial camera pose.

The process of estimating an initial camera pose using an input depth image will be described. An initial camera pose P1 may be estimated through matching between at least one first point selected from an $i^{th}$ frame, for example, points on the left and at least one second point selected from an $(i+1)^{th}$ frame, for example, points on the right, among point clouds.

However, as described above, the depth image may have a poor noise characteristic. Further, due to various reasons such as depth folding, for example, a depth value error may be present. Accordingly, the following pose refining process may be performed.

FIG. 5 illustrates an example of a pose refining process.

A first point within a depth image 511 of an $i^{th}$ frame and a second point within a depth image 521 of an $(i+1)^{th}$ frame may be assumed to be matched to each other.

In this example, the refiner 120 may perform additional matching by referring to color information of a region corresponding to a radius r around the first point and color information of a region corresponding to a radius around the second point. The color information may be used from each of a color image 512 of the $i^{th}$ frame and a color image 522 of the $(i+1)^{th}$ frame.

The radius r may be adaptively set to vary based on a depth value of the first point and/or a depth value of the second point. The above process will be described in further details with reference to FIG. 6.

Figure 6:
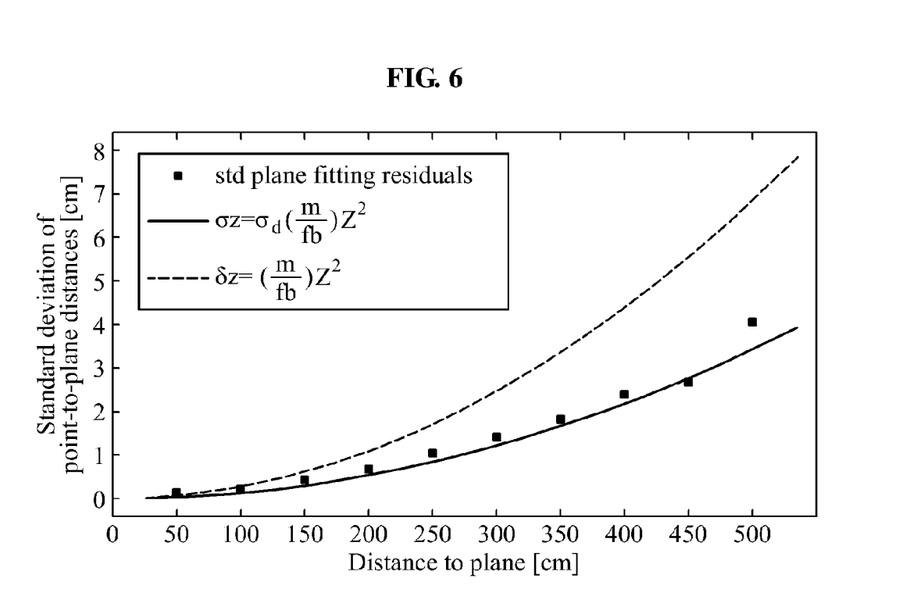
FIG. 6 is a diagram illustrating an example of a graph to describe a process of adaptively setting a radius of a first region for performing color value matching for pose refinement.

FIG. 6 illustrates an example of a graph to describe a process of adaptively setting a radius of a first region for performing color value matching for pose refinement.

Referring to FIG. 6, according to an increase in a distance, for example, an X axis, between a virtual plane of a camera viewpoint to be rendered and a point used for pose estimation, a standard variation of depths, for example, an Y axis may also increase. In one example where a noise characteristic is poor, for example, in a situation in which a depth value is great, a relatively large number of candidate points for matching may be used by setting the radius r of FIG. 5 to be large.

A camera pose estimation process according to an example will be described with reference to FIG. 7.

Figure 7:
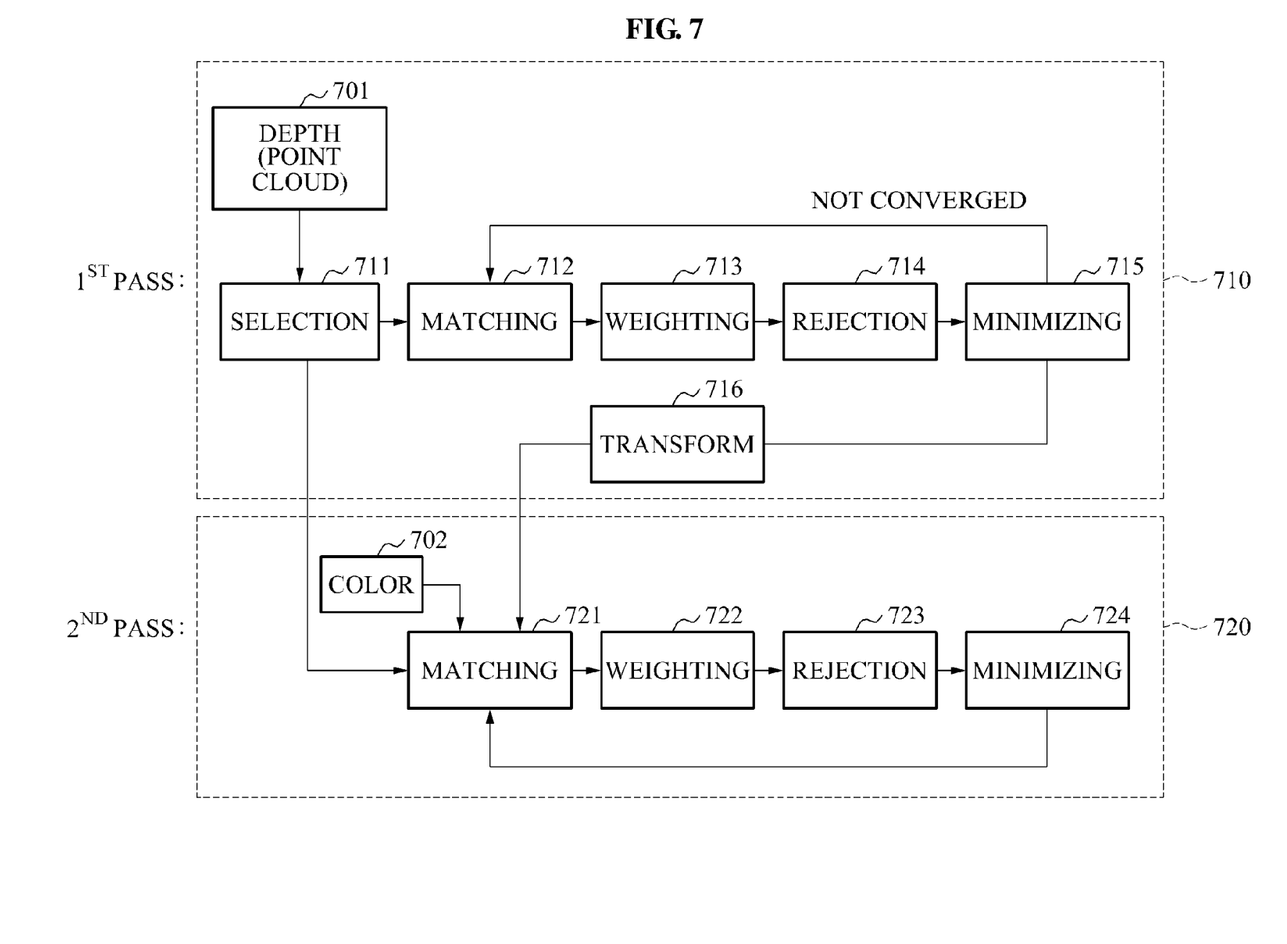
FIG. 7 is a diagram illustrating an example of a camera pose estimation method.

FIG. 7 illustrates an example of a camera pose estimation method.

Referring to FIG. 7, a camera pose may be estimated using a 2-pass ICP algorithm 2-passes may include a first pass 710 of estimating an initial camera pose using geometric matching of a point cloud 701 acquired from an input depth image and a second pass 720 for determining a more accurate camera pose by refining the initial camera pose using an input color image 702.

An operation flow of FIG. 7 may be exemplarily, but not limitedly understood as a pipeline algorithm to perform continuous and/or parallel camera pose estimation. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently.

An ICP algorithm is known as an algorithm to align 3D point clouds acquired from different viewpoints. Even though the ICP algorithm, in principle, relates to processing completely overlapped computer created data, the ICP algorithm may be used for other transformations such as analyzing correlation of partially overlapped data, for example.

In one example, the ICP algorithm may be performed using two passes and thus, the initial camera pose may be estimated rapidly and roughly using a point cloud in the first pass 710. A process of estimating a camera pose by frame-by-frame matching at least one first point included in an input depth image in the first pass 710 may be understood as the general ICP algorithm.

The ICP algorithm may be performed through a selection operation 711 of selecting first points to be used for matching, a matching operation 712 of matching 3D point clouds between frames, a weighting operation 713 of assigning a weight associated with matching, a rejection operation 714 of removing an outlier from matching, and a minimizing or error minimizing operation 715 of obtaining a result of minimizing a matching error. For example, a relatively small weight may be assigned according to an increase in a depth value, i.e., according to an increase in a distance from a camera viewpoint. When the depth value is large, a noise characteristic may be poor.

The matching operation 712 through the minimizing operation 715 may be repeated iteratively based on whether the 3D point clouds, for example, the matching results are converged. In an example, the input color image 702 may not be used for the first pass 710.

In the matching operation 712, an Euclidean distance between a model point cloud $Q=\{Q_i | i=1, 2, 3, \ldots, n\}$ and a target point cloud $P=\{P_j | j=1, 2, 3, \ldots, n\}$ may be used as an error metric. Here, n may denote the number of point clouds used for matching. The term "at least one first point"

may be understood to correspond to the model point cloud Q and the term "at least one second point" may be understood to correspond to the target point cloud P.

Accordingly, in the case of inducing the matching result of minimizing the Euclidean distance as the result of the first pass 710, the transformation matrix M=[R|T] between camera viewpoints may be calculated.

For example, R may be a 3×3 rotation matrix and T may be a 3×1 translation vector.

Theoretically, a result of moving Q according to the translation matrix M may need to completely match P and color information may also need to be identical. However, due to a depth error occurring while upscaling a resolution of an input depth image, a depth error occurring during a depth image photographing process, and noise, and the like, complete matching may not be achieved in practice.

In one example, the refiner 120 may calculate a final camera pose at a high accuracy by performing the second pass 720 of refining the transformation matrix M obtained through the first pass 710. The input color image 702 may be used for the second pass 720. For example, color information of a region corresponding to a predetermined radius around a point Qi or Pj included in the model point cloud Q and/or the target point cloud P may be used. Aside from a color feature used for matching information, a matching operation 721, a weighting operation 722, a rejection operation 723, and a minimizing operation 724 of the second pass 720 may be performed using the ICP algorithm, which is similar to the first pass 710.

Further, in the second pass 720, a plurality of neighbor points included in a predetermined region Ω around Pj as well as Pj minimizing the Euclidean distance may be considered as candidate points to be matched with Qi. A candidate point most fitting for color matching may be determined as a final point to be matched with Qi.

As described above with reference to FIG. 6, the radius r of the predetermined region Ω may be adaptively set during the above process. A depth error or noise may give a relatively great effect on a point that is positioned away from a viewpoint, for example, a point having a great depth value. Accordingly, neighbor points within a relatively great radius may be considered as candidate points and be used for matching and a description related thereto is already made above with reference to FIG. 6.

Figure 8:
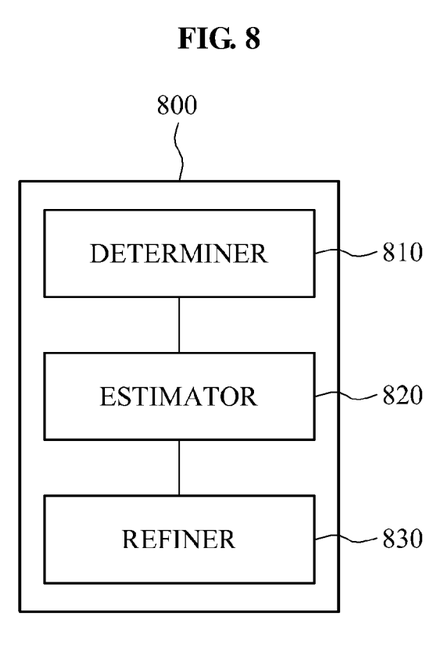
FIG. 8 is a diagram illustrating another example of a camera pose estimation apparatus.

FIG. 8 illustrates another example of a camera pose estimation apparatus.

A determiner 810 of the camera pose estimation apparatus 800 may determine whether to use either an input color image or an input depth image for camera pose estimation, or whether to use all of the input color image and the input depth image. The determination may also be expressed as an estimation mode determination.

When a depth image and a color image matching the depth image are input, the determiner 810 may calculate 3D coordinates from the input depth image. The determiner 810 may extract a geometric feature from the input depth image and may extract a color feature or a visual feature from the input color image.

During a process of extracting a geometric feature, an algorithm, such as, for example, a normal aligned radial feature (NARF) algorithm, a 3D Harris corner algorithm, or a 3D scale-invariant transform (SIFT) algorithm, for example, may be applied to a 3D point cloud. During a process of extracting a color feature, an algorithm, such as, for example, a Harris corner algorithm, an SIFT algorithm, a speeded up robust feature (SURF) algorithm, or a fast corner (FAST) algorithm, for example, may be applied.

In an example, when the extracted geometric feature is greater than or equal to a level, the input depth image may be determined to have a high reliability sufficient to be used for camera pose estimation. When the extracted color feature is greater than or equal to a level, which may be a level different from the geometric feature, the input color image may be determined to have a high reliability sufficient to be used for camera pose estimation. During the above process, a planar region may be defined using a random sample consensus (RANSAC) algorithm and information associated with 2D features present on the planar region may be used for the determination. Further, a parallel tracking and mapping (PTAM) algorithm may also be employed.

When only the input color image has the high reliability, the determiner 810 may determine a camera pose estimation mode as a color-only mode using only the input color image. When only the input depth image has the high reliability, the determiner 810 may determine the camera pose estimation mode as a depth-only mode using only the input depth image. When all of the input color image and the input depth image have the high reliability, the determiner 810 may determine the camera pose estimation mode as a color-and-depth mode using all of the input color image and the input depth image.

When the color-and-depth mode is determined to be used, an estimator 820 may proceed with the first pass 710 of FIG. 7 using the input depth image, and a refiner 830 may determine a refined final camera pose by performing the second 2D pass 720 on the estimated initial camera pose.

Operations of the estimator 820 and the refiner 830 may be the same as the description made above with reference to FIG. 1 through FIG. 7. Operations of the determiner 810 will be further described with reference to FIG. 9 and FIG. 10. The above descriptions of FIG. 1-7 is incorporated herein by reference. Thus, the above description may not be repeated here.

Figure 9:
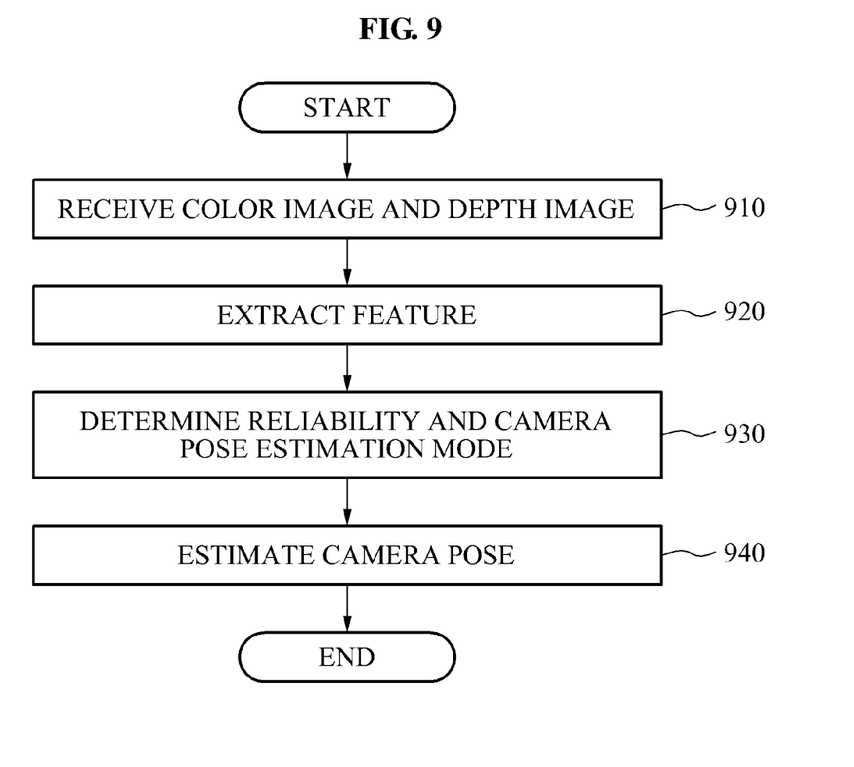
FIG. 9 is a diagram illustrating another example of a camera pose estimation method.

FIG. 9 illustrates another example of a camera pose estimation method.

In operation 910, a color image and a depth image may be received by a camera pose estimation apparatus. The input color image and the input depth image may be matched to each other in terms of a resolution or a viewpoint.

In operation 920, a geometric feature may be extracted from the input depth image by calculating 3D coordinates and a color feature may be extracted from the input color image.

In operation 930, the determiner 810 of FIG. 8 may determine a camera pose estimation mode.

In an example, when only the input color image has the high reliability, the determiner 810 may determine the camera pose estimation mode as a color-only mode using only the input color image. In an example, when only the input depth image has the high reliability, the determiner 810 may determine the camera pose estimation mode as a depth-only mode using only the input depth image. When all of the input color image and the input depth image have the high reliability, the determiner 810 may determine the camera pose estimation mode as a color-and-depth mode using all of the input color image and the input depth image.

In operation 940, the camera pose may be estimated using the estimator 820 and the refiner 830, which is described above with reference to FIG. 1 through FIG. 7. The above descriptions of FIG. 1-7 is incorporated herein by reference. Thus, the above description may not be repeated here.

The geometric feature and the color feature used to determine the camera pose estimation mode will be described with reference to FIG. 10.

Figure 10:
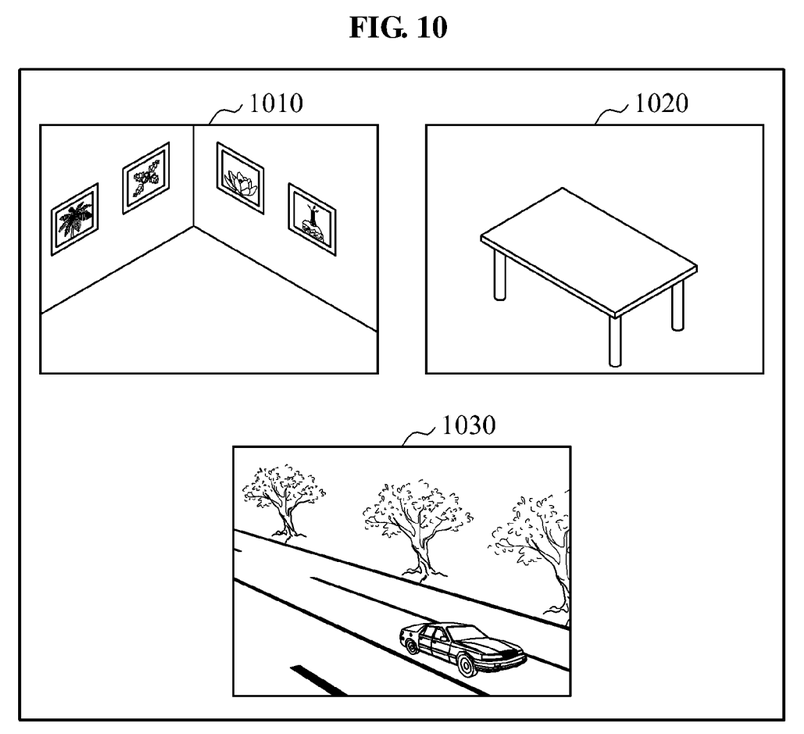
FIG. 10 is a diagram illustrating examples of scenes to describe a process of determining a camera pose estimation mode.

FIG. 10 illustrates examples of scenes 1010, 1020, and 1030 to describe a process of determining a camera pose estimation mode.

Referring to FIG. 10, for example, the scene 1010 may refer to a scene in which a geometric pattern is simple and complexity is low. In the case of extracting a color feature from the scene 1010, a feature to be matched may be greater than or equal to a predetermined level and thus, an input color image may have a high reliability. However, a geometric feature fitting for matching may not be extracted. Accordingly, in scene 1010, the determiner 810 of FIG. 8 may determine a camera pose estimation mode as a color-only mode using only the input color image.

As another example, the scene 1020 may refer to a scene in which a geometric pattern is relatively complex and a color tone is simple. Accordingly, a color feature corresponding to at least a predetermined level may not be extracted. In scene 1020, the color feature may not fit for camera pose estimation and thus, the determiner 810 may determine the camera pose estimation mode as a depth-only mode using only the input depth image.

As still another example, the scene 1030 may refer to a scene in which a color texture is sufficient and a geometric complexity is high. In this example, the determiner 810 may determine the camera pose estimation mode as a color-and-depth mode using all of the input color image and the input depth image. Accordingly, in scene 1030, depth information and color information may be used to perform camera pose estimation described above with reference to FIG. 1 through FIG. 7.

The apparatuses and other components illustrated herein that perform the operations described herein may be implemented using hardware components. For example, the apparatuses and the components may be configured using at least one universal computer or special purpose computer, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods that perform the operations described herein are performed by a processor or a computer as described above executing instructions or software to perform the operations described herein. The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for camera pose estimation, the apparatus comprising:
   an estimator configured to estimate an initial camera pose associated with a first image by matching at least one first point included in a first frame and at least one second point included in a second frame, with respect to the first image that is one of an input depth image and an input color image;
   a determiner to determine whether to use the input color image to estimate the initial camera pose based on a reliability of the input color image and a reliability of the input depth image; and
   a refiner configured to provide a refined camera pose by refining the initial camera pose using a second image, between the input depth image and the input color image.

2. The apparatus of claim 1, wherein the estimator is further configured to match the at least one first point and the at least one second point using an iterative closest point (ICP) algorithm.

3. The apparatus of claim 1, wherein the first image corresponds to the input depth image and the second image corresponds to the input color image.

4. The apparatus of claim 3, wherein the estimator is further configured to select the at least one first point included in the first frame and the at least one second point included in the second frame, from among point clouds included in the input depth image.

5. The apparatus of claim 4, wherein the estimator is further configured to select, from the first frame and the second frame, at least one point having a depth variation less than or equal to a threshold variation among the point clouds.

6. The apparatus of claim 3, wherein the refiner is further configured to refine the initial camera pose based on the input color image within a first region included in a first radius around the at least one first point.

7. The apparatus of claim 6, wherein the first radius is set to increase according to an increase in a depth value of the at least one first point.

8. An apparatus for camera pose estimation, the apparatus comprising:
  a determiner configured to determine a camera pose estimation mode associated with an input depth image and an input color image by analyzing at least one feature of the input depth image and the input color image and to determine whether to use the input color image to estimate an initial camera pose based on a reliability of the input color image and a reliability of the input depth image;
  an estimator configured to estimate the initial camera pose between a first frame and a second frame by matching at least one first point included in the first frame and at least one second point included in the second frame different from the first frame, with respect to the input depth image when the determined camera pose estimation mode corresponds to a camera pose estimation using all of the input depth image and the input color image; and
  a refiner configured to provide a refined camera pose by refining the initial camera pose through matching between surrounding color information of the at least one first point and surrounding color information of the at least one second point using the input color image.

9. The apparatus of claim 8, wherein the determiner is further configured to determine that the camera pose estimation mode corresponds to the camera pose estimation using all of the input depth image and the input color image, in response to a depth feature point extracted from a depth value of the input depth image being greater than or equal to a first threshold, and a color feature point extracted from a color value of the input color image being greater than or equal to a second threshold.

10. The apparatus of claim 8, wherein the refiner is further configured to refine the initial camera pose based on the input color image within a first region included in a first radius around the at least one first point.

11. The apparatus of claim 10, wherein the first radius is set to increase according to an increase in a depth value of the at least one first point.

12. A method for camera pose estimation, the method comprising:
  estimating, by an estimator of a camera pose estimation apparatus, an initial camera pose associated with an input depth image by primarily matching at least one first point included in a first frame and at least one second point included in a second frame, with respect to the input depth image using an iterative closest point (ICP) algorithm;
  determining, by a determiner, whether to use the input color image to estimate the initial camera pose based on a reliability of the input color image and a reliability of the input depth image; and
  establishing, by a refiner of the camera pose estimation apparatus, a first radius of a first region including the at least one first point in order to perform secondary matching using an input color image associated with the input depth image, the secondary matching using a color feature matching within the first region.

13. The method of claim 12, wherein the first radius is set to increase according to an increase in a depth value of the at least one first point.

14. The method of claim 12, further comprising:
  determining, by the determiner of the camera pose estimation apparatus, a camera mode estimation mode based on depth feature information extracted from the input depth image and color feature information extracted from the input color image.

15. The method of claim 12, wherein each of the at least one first point and the at least one second point corresponds to a point having a reliability greater than or equal to a predetermined threshold based on a depth distribution.

16. A non-transitory computer-readable medium comprising a program for instructing a computer to perform the camera pose estimation method according to claim 12.

* * * * *